C. E. BAUER.
GUIDE.
APPLICATION FILED OCT. 19, 1911.
1,020,876.
Patented Mar. 19, 1912.
2 SHEETS—SHEET 1.
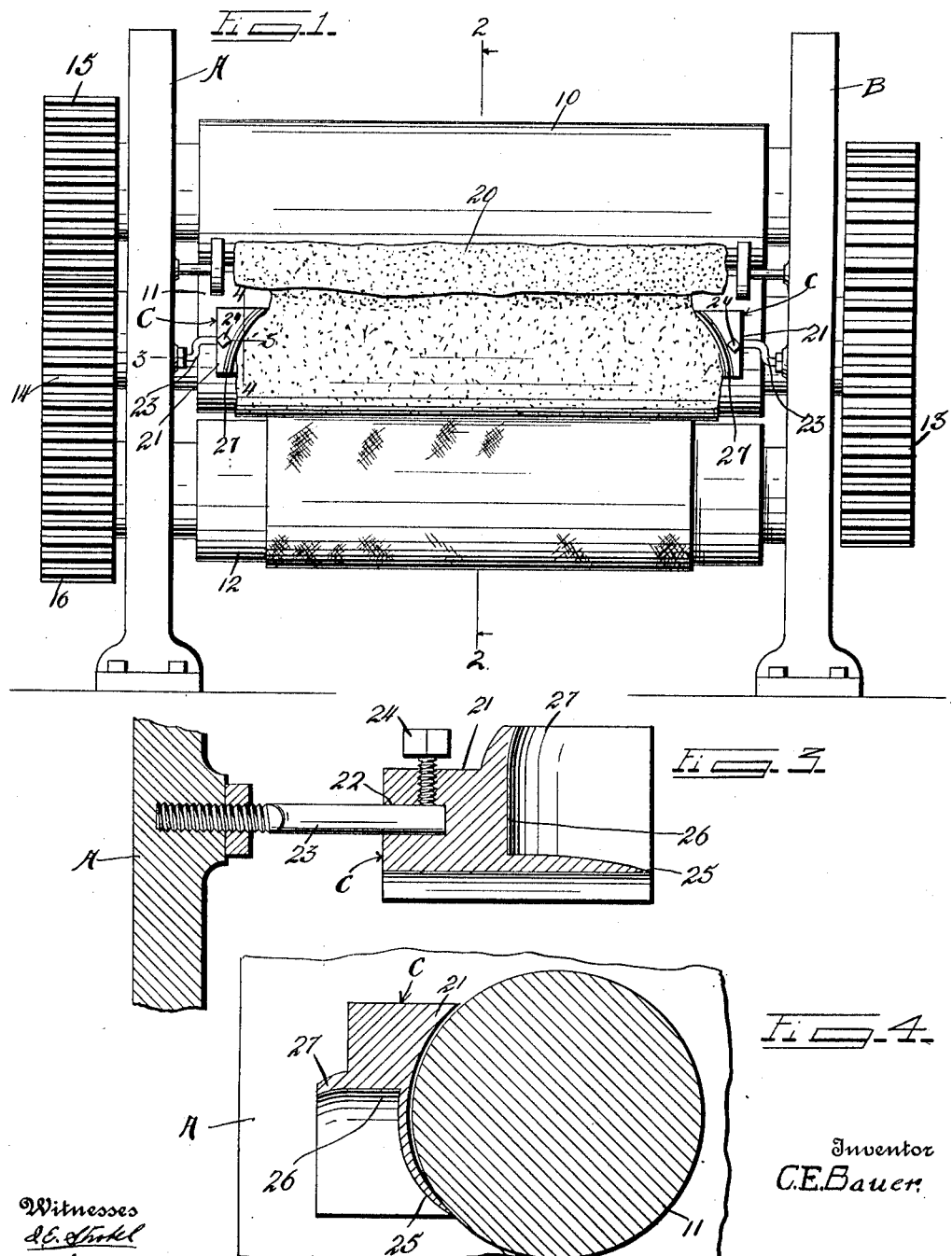
Witnesses
&E. Strkl
Henry T. Bright
Inventor
C. E. Bauer.
By
Chandler & Chandler
Attorneys.

C. E. BAUER.
GUIDE.
APPLICATION FILED OCT. 19, 1911.
1,020,876.
Patented Mar. 19, 1912.
2 SHEETS—SHEET 2.
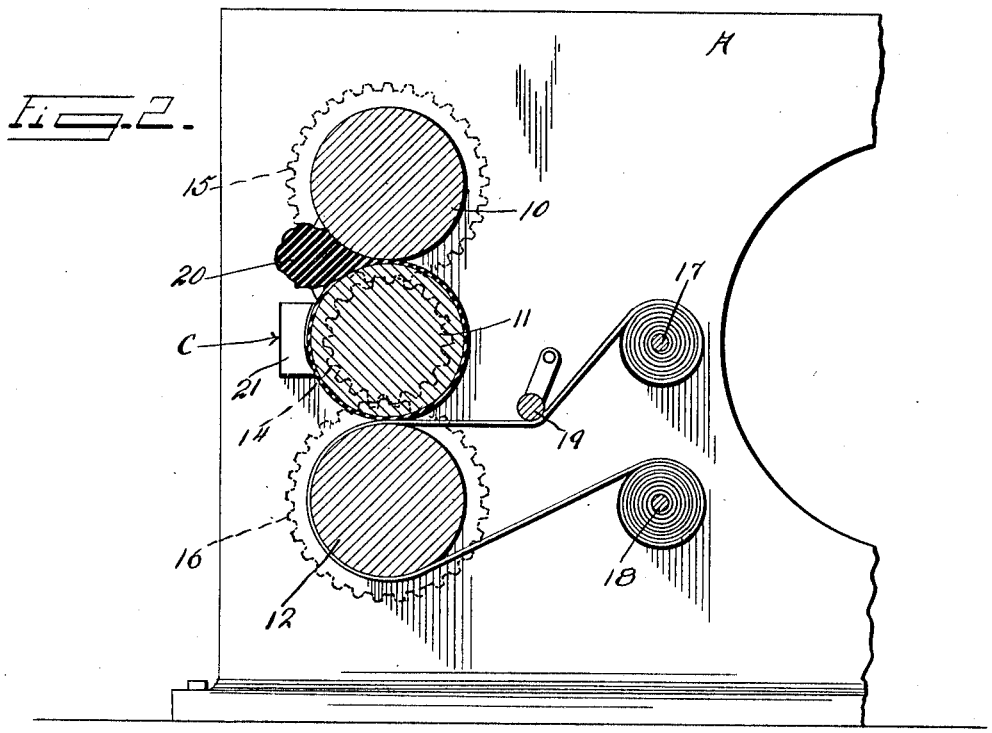
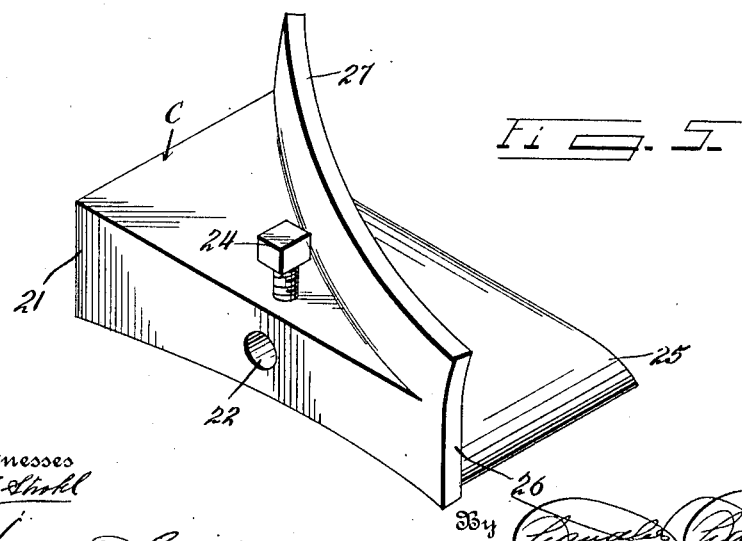

UNITED STATES PATENT OFFICE.

CLARENCE E. BAUER, OF AKRON, OHIO, ASSIGNOR OF ONE-FOURTH TO FRED BAUER AND ONE-FOURTH TO ARTHUR CISLER, BOTH OF AKRON, OHIO.

GUIDE.

1,020,876.   Specification of Letters Patent.   Patented Mar. 19, 1912.

Application filed October 19, 1911. Serial No. 655,469.

*To all whom it may concern:*

Be it known that I, CLARENCE E. BAUER, a citizen of the United States, residing at Akron, in the county of Summit, State of Ohio, have invented certain new and useful Improvements in Guides; and I do hereby declare the following to be a full, clear, and exact description of the invention, such as will enable others skilled in the art to which it appertains to make and use the same.

This invention relates to guides, and particularly to that type adapted for use in coating machines of the friction calendar roll type.

The object of the invention resides in the provision of a guide adapted to be disposed at each end of one of the calender rolls of a machine of the character named and when so disposed will operate to direct the plastic rubber inwardly of the roll during the rotation thereof and thereby prevent the rubber from flowing or spreading beyond the side edges of the fabric during the coating operation.

A further object of the invention resides in the provision of a guide of the character named which may be easily associated with the friction calender coating machine and when so associated will effectually prevent the spreading of the rubber beyond the lateral edges of the fabric being coated.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1 is an end view of a coating machine of the friction calender type showing the improved guide associated therewith at opposite ends of one of the calender rolls, Fig. 2, a section on the line 2—2 of Fig.1, Fig. 3, an enlarged section on the line 3—3 of Fig. 1, Fig. 4, an enlarged section on the line 4—4 of Fig. 1, and Fig. 5, a detail perspective view of one of the guides.

Referring to the drawings, A and B indicate the side frame members of the machine between which are journaled vertically alined coöperating calender rolls 10, 11 and 12, the rolls 10 and 12 forming the limiting rolls and the roll 11 the intermediate roll. The trunnions of the roll 11 are extended through the frame members A and B and mounted on the trunnion adjacent the frame member B is a large gear 13 which is suitably connected with a source of power so as to institute the rotation of the roll 11 during the operation of the machine. The trunnion of the roll 11 adjacent the frame A has fixed thereon a small gear 14 for a purpose that will presently appear. The trunnion of the roll 10 is extended through the frame member A and has fixed thereon a gear 15 somewhat larger than the gear 14 and meshing with the latter. Likewise the trunnion of the roll 12 is extended through the frame member A and has fixed thereon a gear 16 corresponding in diameter to the gear 15 and meshing with the gear 14. By this construction it will be apparent that upon the rotation of the roll 11 the gears 15, 14 and 16 will serve to transmit same to the rolls 10 and 12, but as the gears 15 and 16 are larger than the gear 14 the rolls 10 and 12 will rotate at a less speed than the roll 11.

Journaled between the frame members A and B inwardly of the calender rolls 10, 11 and 12 are fabric supply and receiving rolls 17 and 18 respectively, the former being disposed at a greater elevation than the latter. Fabric from the roll 17 is guided by a jockey roll 19, journaled between the members A and B, to between the calender rolls 11 and 12 and thence around the latter to the receiving roll 18. The rolls 17 and 18 are adapted to be rotated in any suitable manner to effect the proper feed of the fabric from one roll to another.

During the operation of the machine, a supply of plastic rubber 20 is positioned between the rolls 10 and 11 and during the rotation of said rolls is fed upon the surface of the roll 10 so that same will be subsequently conveyed against the fabric passing between the rolls 11 and 12. As previously stated the speed of the roll 11 is greater than the speed of the roll 12 which will cause the roll 11 to friction on the roll 12 and properly apply the rubber coat to the fabric as will be apparent.

Mounted from the frame members A and B respectively at each end of the calender roll 11 are oppositely disposed guides C.

Each of these guides consists of a body portion 21 having an opening 22 in its outer edge which receives one end of a stem 23, the other end of the latter being detachably secured to respective members A and B. The guides C are held against disengagement from respective stems 23 by means of set screws 24 mounted therein and adapted to impinge upon respective stems. By this construction it will be apparent that the stems 23 serve to support the guides C in proper relation to the roll 11 it being understood that the face of the guides adjacent the periphery of the roll 11 conforms in superficial shape to the latter and is disposed very close to said periphery of the roll 11. The body portion 21 of each guide C terminates in an inwardly disposed reduced knife like blade portion 25 forming a curved resultant shoulder 26, said shoulders of the guides at opposite ends of the roll 11 being directed toward each other in the direction of rotation of said roll. The body portion 21 of each guide is provided with an outwardly directed flange 27 following the general direction of the shoulder 26 and having one face thereof in registration with the face of said shoulder. By this construction it will be apparent that during the operation of the machine the rubber upon the roll 11 disposed at the outer edge of the latter and which has not been applied to the fabric will be scraped from the roll by the blade portion 25 of each guide and directed by the shoulder 26 and flange 27 inwardly of said roll and redelivered to the latter at the opposite ends of the guides. It will thus be apparent that the possibility of the rubber spreading upon the roll 11 laterally beyond the sides of the fabric is automatically prevented and manual attention to this part of the work in the operation of the machine obviated.

What is claimed is:

1. In a coating machine, the combination of a frame, a coating material carrying calender roll journaled in said frame, material guides supported from said frames at each end of the calender roll, each of said guides comprising a body portion having its lower face conforming substantially in superficial shape to the periphery of the roll and reduced at its inner portion to form a scraper blade and a resultant curved shoulder directed inwardly of the roll in the direction of the rotation of the latter, said blade being adapted to scrape the coating material from the roll during the rotation thereof and said shoulder adapted to direct the material removed from the roll inwardly of the latter.

2. A guide of the class described, comprising a body portion provided with means for attachment to the frame of a coating machine to dispose the guide in proximity to one of the calender rolls of the machine, said guide comprising a body portion having its lower face conforming substantially in superficial shape to the periphery of a calender roll and reduced at its inner portion to form a scraper blade and a resultant curved shoulder, and a flange on said body portion having one side thereof in registration with said resultant shoulder.

In testimony whereof, I affix my signature, in the presence of two witnesses.

CLARENCE E. BAUER.

Witnesses:
LULA BAUER,
JOHN W. THOMAS.

Copies of this patent may be obtained for five cents each, by addressing the "Commissioner of Patents, Washington, D. C."